L. E. WEBSTER.
JUNCTION BOX COUPLING FOR ELECTRIC WIRE CONDUITS.
APPLICATION FILED OCT. 14, 1915.
1,245,077. Patented Oct. 30, 1917.
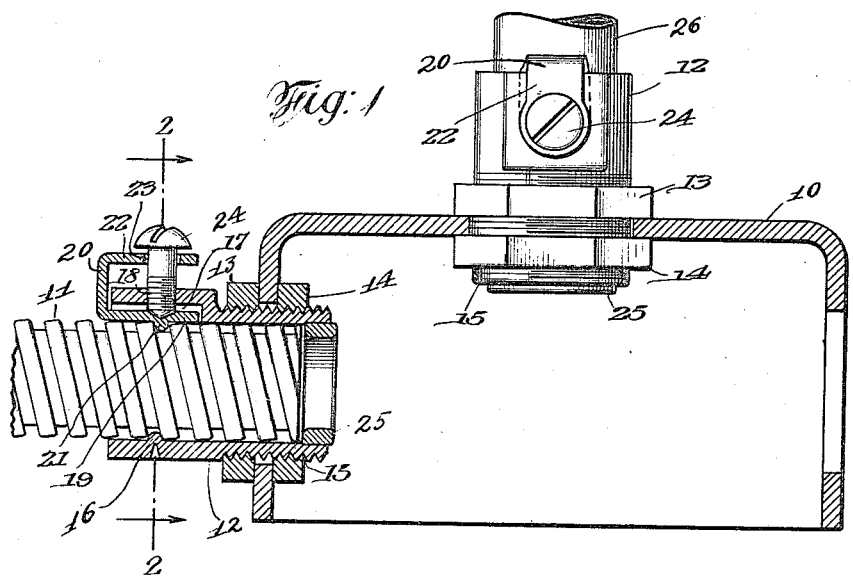
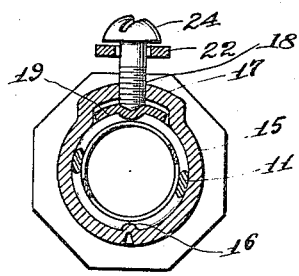
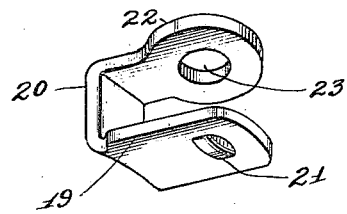
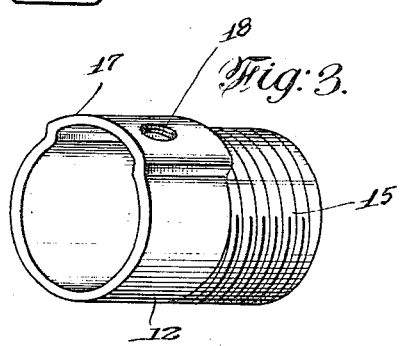
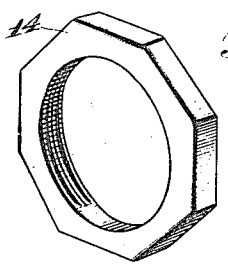
Witness
John J. Kittel
Inventor
LEWIS E. WEBSTER
By Attorney
Robert Magrane

UNITED STATES PATENT OFFICE.

LEWIS E. WEBSTER, OF WILKES-BARRE, PENNSYLVANIA, ASSIGNOR OF ONE-FIFTH TO WILLIAM BULLOCK, ONE-FIFTH TO CHARLES M. HELFRICH, ONE-FIFTH TO FREDERICK W. EDDY, AND TWO-FIFTHS TO JOHN M. PARRY, ALL OF WILKES-BARRE, PENNSYLVANIA, COPARTNERS TRADING UNDER THE NAME OF WEBER MANUFACTURING COMPANY.

JUNCTION-BOX COUPLING FOR ELECTRIC-WIRE CONDUITS.

1,245,077.   Specification of Letters Patent.   Patented Oct. 30, 1917.

Application filed October 14, 1915.  Serial No. 55,760.

*To all whom it may concern:*

Be it known that I, LEWIS E. WEBSTER, a citizen of the United States, residing at Wilkes-Barre, in the county of Luzerne and State of Pennsylvania, have invented a new and useful Improvement in Junction - Box Couplings for Electric-Wire Conduits, of which the following is a specification.

This invention relates to electric wiring systems, and has particular reference to methods of attaching conduits to outlet or junction boxes.

One object of the invention is to provide a coupler for the box and conduit, simple in structure, cheap to manufacture, and forms a permanent clamp not easily loosened by accident. Another object is to provide a clamp which may be easily applied to the box and in which the conduit is more securely held than in the ordinary forms now in use. Another object is to provide a coupler which permits of more or less adjustment with relation to the interior of the box, so that the coupler occupies a minimum amount of space within the box.

Referring to the drawings:

Figure 1 represents a sectional elevation of an outlet box with conduit attached;

Fig. 2 represents an end elevation and section on the line 2—2 of Fig. 1;

Fig. 3 is a view in perspective of the coupler sleeve;

Fig. 4 is a view in perspective of the coupler jaw;

Fig. 5 is a view in perspective of a clamping nut.

As shown in Fig. 1, the outlet box is indicated at 10. The conduit, which is the usual flexible armor sheath formed of spiral convolutions, having a surface like that of a screw thread, is indicated at 11.

The coupler includes a cylindrical sleeve 12, which is attached to the box, as shown in Fig. 1, by two clamping nuts 13 and 14, which engage a threaded portion 15 of the sleeve. As shown in Fig. 1, this arrangement permits by manipulation of these nuts the extension into the box of the sleeve to any desired extent. The sleeve is provided with a projection 16 adapted to engage between the threads of the conduit, and diametrically opposite this projection is a recess 17, in the center of which is a threaded aperture 18. Within this recess 17 is located one extension 19 of a U-shaped member 20, this extension forming a clamping jaw for the conduit; it is provided with a projection 21 adapted to enter between the threads of the conduit. The upper extension 22 of this member is provided with an aperture 23 through which the clamping screw 24 is freely movable. The clamping screw 24 has a threaded engagement with the aperture 18 of the sleeve and the lower end of the screw bears upon the extension 19 of the jaw directly above the projection 21, the aperture 23 and projection 21 being in register with each other as shown.

In the structure thus described the U-shaped clamp indicated generally at 20 has its member 19 positioned parallel with the conduit. The screw exercises a direct thrust against the jaw, giving a maximum of pressure to the jaw. By means of this parallel positioning of member 19 the bite of the jaw is extended over a considerable surface of the conduit, which is of relatively soft material and the conduit will not be injured therefore, when the screw is turned as far as it will go. In the construction shown, a considerable latitude of movement is allowed the jaw 20 so that the device will handle variable sizes of the conduit. By providing the extension 22, through which the screw 24 passes, the positioning of member 19 parallel with the conduit is assured and a further advantage is that the jaw is always permanently attached to the sleeve, so that it is not necessary to fit these parts together in the work of installation.

An eyelet 25 is provided at the interior end of the sleeve to limit the movement of the conduit into the box or through the sleeve and to provide a rounding and safe edge to prevent abrasion of the insulation.

As shown in Fig. 1, the coupler may also be utilized to attach the box to an ordinary gas fitting, such as the vertical pipe indicated at 26.

I claim:

1. In combination, an outlet box, a conduit, and a coupler for the box and conduit, the coupler including a sleeve to receive the conduit, a clamping screw, a U-shaped jaw, one extension of said jaw having a projection adapted to engage the conduit between the threads thereof, the second extension having an aperture through which the said screw is freely movable, the screw being in threaded engagement with the sleeve, the said aperture being in register with said projection.

2. In combination, an outlet box, a conduit, and a coupler for the box and conduit, the coupler including a sleeve to receive the conduit, a clamping screw in threaded engagement with the sleeve, a U-shaped jaw, one extension of the jaw extending into the path of the end of the screw to clamp the conduit, and the second extension having a guiding aperture through which the shank of the screw is freely movable.

3. A coupler of the class described comprising a sleeve to receive the conduit having a recess on its inner face at one end thereof, a U-shaped clamp straddling the edge of the recessed end of said sleeve with one extension thereof disposed in said recess and the other extension outside the sleeve and parallel with its longitudinal axis the recessed portion of said sleeve and the outlying extension of the clamp having registering apertures, and a screw extending through the aperture in said clamp and having threaded engagement with the aperture in the sleeve.

4. A coupler of the class described comprising a sleeve to receive a conduit having a recess on its inner face at one end thereof, a U-shaped clamp straddling the edge of the recessed end of said sleeve with one extension disposed in said recess and the other extending outside the sleeve and parallel with its longitudinal axis, the recessed portion of said sleeve and the outlying extension of the clamp having registering apertures, a screw extending through the aperture in said clamp and having threaded engagement with the aperture in the sleeve, and coöperating projections on said sleeve and clamp for engagement with a conduit between the threads thereof at diametrically opposite points.

5. A coupler of the class described comprising a sleeve to receive a conduit, a U-shaped clamp having one extension projecting into the interior of said sleeve, the other disposed over the outside thereof, said outer extension and the adjacent portion of the sleeve having alined apertures, and a screw extending through the aperture in said extension, and having threaded engagement with the aperture in the sleeve, said outer extension forming a guide for the screw.

6. A coupler of the class described comprising a sleeve to receive a conduit having a recess in its inner face at one end thereof, a U-shaped clamp straddling the edge of the recessed end of said sleeve and one extension thereof disposed in said recess and the other over the outside of the sleeve, said outer extension and the adjacent portion of the sleeve having alined apertures, and a screw extending through the aperture in the outer extension and having threaded engagement with the aperture in the same, said outer extension forming a guide for said screw.

LEWIS E. WEBSTER.